(12) United States Patent
Luo et al.

(10) Patent No.: US 10,484,639 B2
(45) Date of Patent: Nov. 19, 2019

(54) IMAGE GENERATION METHOD AND DEVICE

(71) Applicant: Beijing Kingsoft Internet Security Software Co., Ltd., Beijing (CN)

(72) Inventors: Xuan Luo, Beijing (CN); Xiancong Lei, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 0 days.

(21) Appl. No.: 15/747,086

(22) PCT Filed: Aug. 15, 2016

(86) PCT No.: PCT/CN2016/095327
§ 371 (c)(1),
(2) Date: Jan. 23, 2018

(87) PCT Pub. No.: WO2017/032233
PCT Pub. Date: Mar. 2, 2017

(65) Prior Publication Data
US 2018/0376097 A1    Dec. 27, 2018

(30) Foreign Application Priority Data
Aug. 21, 2015 (CN) .......................... 2015 1 0516412

(51) Int. Cl.
*H04N 5/44* (2011.01)
*G06F 3/0484* (2013.01)
(Continued)

(52) U.S. Cl.
CPC ......... *H04N 5/4448* (2013.01); *G06F 3/0484* (2013.01); *H04N 5/445* (2013.01);
(Continued)

(58) Field of Classification Search
CPC ...... H04N 5/448; H04N 5/445; H04N 21/422; H04N 21/4312; H04N 21/488; G06F 3/0484
See application file for complete search history.

(56) References Cited

U.S. PATENT DOCUMENTS

| | | | |
|---|---|---|---|
| 2009/0305782 A1* | 12/2009 | Oberg .................... | A63F 13/10 463/31 |
| 2012/0206374 A1* | 8/2012 | Chen .................... | G06F 3/03545 345/173 |
| 2013/0086507 A1* | 4/2013 | Poston .................. | G06F 3/0483 715/777 |

FOREIGN PATENT DOCUMENTS

| CN | 101488333 A | 7/2009 |
|---|---|---|
| CN | 102779008 A | 11/2012 |

(Continued)

*Primary Examiner* — Michael E Teitelbaum
(74) *Attorney, Agent, or Firm* — Bret E. Field; Bozicevic, Field & Francis LLP

(57) ABSTRACT

Embodiments of the present application disclose an image generation method and device, which relate to the technical field of image processing. The method comprises: receiving a screenshot instruction; generating a layer corresponding to the screenshot instruction, storing image content in a screen region selected by a user into a storage area corresponding to the generated layer, and displaying, on the generated layer, the image content in the screen region selected by the user, wherein, the storage area corresponding to the generated layer is independent of the storage area corresponding to the layer, which is in an unclosed state, generated according to the previously received screenshot instruction; and after receiving an image generation instruction for at least one layer currently in the unclosed state, generating an output image corresponding to the image generation instruction according to one or more layers corresponding to one or more layer identifiers contained in the image generation instruction, wherein the image generation instruction con- (Continued)

tains one or more layer identifiers of one or more layers selected by the user. By applying the solution provided by embodiments of the present application, the steps of capturing images many times can be simplified.

19 Claims, 3 Drawing Sheets

(51) Int. Cl.
    *H04N 5/445*     (2011.01)
    *H04N 21/422*     (2011.01)
    *H04N 21/431*     (2011.01)
    *H04N 21/488*     (2011.01)

(52) U.S. Cl.
    CPC ....... *H04N 21/422* (2013.01); *H04N 21/4312* (2013.01); *H04N 21/488* (2013.01)

(56) References Cited

FOREIGN PATENT DOCUMENTS

| | | | |
|---|---|---|---|
| CN | 103037102 | A | 4/2013 |
| CN | 103837830 | A | 6/2014 |
| CN | 104238913 | A | 12/2014 |
| CN | 104850327 | A | 8/2015 |
| CN | 105100664 | A | 11/2015 |
| EP | 2464103 | A2 | 6/2012 |

* cited by examiner

IMAGE GENERATION METHOD AND DEVICE

The present application claims the priority of a Chinese patent application No. 201510516412.5, filed with the State Intellectual Property Office of PRC on Aug. 21, 2015 and entitled "IMAGE GENERATION METHOD AND DEVICE", which is incorporated herein by reference in its entirety.

TECHNICAL FIELD

The present application relates to the technical field of image processing, and particularly to an image generation method and device.

BACKGROUND

During the use of computers, tablet PCs, mobile phones and other terminal devices, it is often needed to capture screenshots so as to generate images.

In the prior art, during the generation of an image by capturing a screenshot, a general terminal device generates the image according to the screen region selected by a user and enables an image edition function after receiving an image capturing instruction, and during the edition of the image, the terminal device will cache the image formed according to the edition operation into a preset space, and perform a storage operation on the final cached images after an image storage instruction is received.

However, during the procedure of generating images using the above method, all of the images generated by a terminal device according to image capturing instructions will be stored into the same storage space each time, which will lead to the following problems: if a user wants to capture images again after capturing an image and hopes to store the image currently captured, he/she needs to store the image currently captured and quit the current process of image generation, otherwise, the newly captured images will cover the currently captured images, in this way, the steps of capturing images many times by users are complicated, which leads to poor user experience.

SUMMARY OF THE INVENTION

Embodiments of the present application disclose an image generation method and device, which relate to the technical field of image processing.

To achieve the above objectives, embodiments of the present application disclose an image generation method, which comprises:

receiving a screenshot instruction;

generating a layer corresponding to the screenshot instruction, storing image content in a screen region selected by a user into a storage area corresponding to the generated layer, and displaying, on the generated layer, the image content in the screen region selected by the user, wherein, the storage area corresponding to the generated layer is independent of the storage area corresponding to the layer, which is in an unclosed state, generated according to the previously received screenshot instruction; and after receiving an image generation instruction for at least one layer currently in the unclosed state, generating an output image corresponding to the image generation instruction according to one or more layers corresponding to one or more layer identifiers contained in the image generation instruction, wherein the image generation instruction contains one or more layer identifiers of one or more layers selected by the user.

In a specified implementation of the present application, after displaying, on the generated layer, the image content in the screen region selected by the user, the method further comprises:

receiving an editing operation instruction for the image content displayed on the generated layer;

editing the image content displayed on the generated layer according to the editing operation instruction, obtaining the edited image content, and displaying the edited image content on the generated layer; and storing the edited image content and information related to the editing operation instruction into the storage area corresponding to the generated layer.

In a specified implementation of the present application, in case that the image generation instruction contains an identifier of one layer selected by the user, generating an output image corresponding to the image generation instruction according to one or more layers corresponding to one or more layer identifiers contained in the image generation instruction comprises:

creating an operating system image object; and generating an output image corresponding to the image generation instruction by copying the image content displayed on the layer selected by the user to the created operating system image object according to the layer identifier contained in the image generation instruction.

In a specified implementation of the present application, in case that the image generation instruction contains identifiers of a plurality of layers selected by the user, generating an output image corresponding to the image generation instruction according to one or more layers corresponding to one or more layer identifiers contained in the image generation instruction comprises:

determining, according to the identifiers of the layers contained in the image generation instruction, layers for generating the output image corresponding to the image generation instruction; and performing pixel mixing on the image content displayed on the determined layers according to a preset pixel mixing algorithm to generate the output image corresponding to the image generation instruction.

In a specified implementation of the present application, the image generation instruction further contains an identifier RL of a reference layer;

performing pixel mixing on the image content displayed on the determined respective layers according to a preset pixel mixing algorithm to generate the output image corresponding to the image generation instruction comprises:

searching, in the determined layers, for a layer whose size is inconsistent with that of the layer with the identifier RL;

determining corresponding scaling ratios for the searched layers respectively according to the size of the layer with the identifier RL and the sizes of the searched layers, wherein, the sizes of the searched layers that are scaled according to the determined corresponding scaling ratios are consistent with the size of the layer with the identifier RL;

scaling the image content displayed on the searched layers according to the corresponding scaling ratios for the searched layers respectively; and performing pixel mixing on the scaled image content and the image content displayed on a layer whose size is consistent with the layer with the identifier RL among the determined layers to generate the output image corresponding to the image generation instruction.

In a specified implementation of the present application, the image generation instruction further comprises identifier RL of a reference layer;

performing pixel mixing on the image content displayed on the determined layers according to a preset pixel mixing algorithm to generate the output image corresponding to the image generation instruction comprises:

obtaining a pixel mixing region of any layer Li in the determined layers according to the following expressions, $$w_{di} = \begin{cases} w_{si}, & w_{si} \leq w_{rl} \\ w_{rl}, & w_{si} > w_{rl} \end{cases}, \quad h_{di} = \begin{cases} h_{si}, & h_{si} \leq h_{rl} \\ h_{rl}, & h_{si} > h_{rl} \end{cases},$$

wherein, $w_{di}$, $h_{di}$ represent the width and height of the pixel mixing region of the layer $L_i$, $w_{si}$, $h_{si}$ represent the width and height of the layer $L_i$, and $w_{rl}$, $h_{rl}$ represent the width and height of the layer with the identifier RL; and generating the output image corresponding to the image generation instruction according to the image content displayed on the obtained pixel mixing regions.

In a specified implementation of the present application, the preset pixel mixing algorithm is a pixel mixing algorithm based on pixel transparency.

In a specified implementation of the present application, generating a layer corresponding to the screenshot instruction comprises:

generating one or more layers corresponding to the screenshot instruction, wherein the storage areas corresponding to the generated layers are independent with each other.

In a specified implementation of the present application, the layer currently in an unclosed state includes a layer currently in a foreground processing state and a layer currently in a background to-be-processed state;

the image generation method further comprises:

receiving a layer switching instruction, wherein, the layer switching instruction contains an identifier of a layer currently in a background to-be-processed state which is to be switched; and switching the state of the layer currently in a foreground processing state into a background to-be-processed state, and switching the state of a layer corresponding to the identifier contained in the layer switching instruction into a foreground processing state.

To achieve the above objectives, embodiments of the present application disclose an image generation device, which comprises:

a screenshot instruction receiving module, configured for receiving a screenshot instruction;

a layer generating module, configured for generating a layer corresponding to the screenshot instruction, wherein, the storage area corresponding to the generated layer is independent of the storage area corresponding to the layer, which is in an unclosed state, generated according to the previously received screenshot instruction;

an image storing and displaying module, configured for storing image content in a screen region selected by a user into a storage area corresponding to the generated layer, and displaying, on the generated layer, the image content in the screen region selected by the user; and an image generating module, configured for generating, after receiving an image generation instruction for at least one layer currently in the unclosed state, an output image corresponding to the image generation instruction according to one or more layers corresponding to one or more layer identifiers contained in the image generation instruction, wherein the image generation instruction contains one or more layer identifiers of one or more layers selected by the user.

In a specified implementation of the present application, the image generation device further comprises:

an editing operation instruction receiving module, configured for receiving an editing operation instruction for the image content displayed on the generated layer after the image storing and displaying module displaying, on the generated layer, the image content in the screen region selected by the user;

an image displaying module, configured for editing the image content displayed on the generated layer according to the editing operation instruction, obtaining the edited image content, and displaying the edited image content on the generated layer; and an information storing module, configured for storing the edited image content and information related to the editing operation instruction into the storage area corresponding to the generated layer.

In a specified implementation of the present application, in case that the image generation instruction contains an identifier of one layer selected by the user, the image generating module comprises:

an object creating submodule, configured for creating an operating system image object; and a first image generating submodule, configured for generating an output image corresponding to the image generation instruction by copying the image content displayed on the layer selected by the user to the created operating system image object according to the layer identifier contained in the image generation instruction.

In a specified implementation of the present application, in case that the image generation instruction contains identifiers of a plurality of layers selected by the user, the image generating module comprises:

a layer determining submodule, configured for determining, according to the identifiers of the layers contained in the image generation instruction, layers for generating the output image corresponding to the image generation instruction; and a second layer determining submodule, configured for performing pixel mixing on the image content displayed on the determined layers according to a preset pixel mixing algorithm to generate the output image corresponding to the image generation instruction.

In a specified implementation of the present application, the image generation instruction further contains an identifier RL of a reference layer; and the second layer determining submodule comprises:

a layer searching unit, configured for searching, in the determined layers, for a layer whose size is inconsistent with that of the layer with the identifier RL;

a scaling ratio determining unit, configured for determining corresponding scaling ratios for the searched layers respectively according to the size of the layer with the identifier RL and the sizes of the searched respective layers, wherein, the sizes of the searched layers that are scaled according to the determined corresponding scaling ratios are consistent with the size of the layer with the identifier RL;

a scaling processing unit, configured for scaling the image content displayed on the searched layers according to the corresponding scaling ratios for the searched layers respectively; and a first image generating unit, configured for performing pixel mixing on the scaled image content and the image content displayed on a layer whose size is consistent with the layer with the identifier RL among the determined layers to generate the output image corresponding to the image generation instruction.

In a specified implementation of the present application, the image generation instruction further comprises identifier RL of a reference layer; and the second layer determining submodule comprises:

a region determining unit, configured for obtaining a pixel mixing region of any layer Li in the determined layers according to the following expressions, $$w_{di} = \begin{cases} w_{si}, & w_{si} \le w_{rl} \\ w_{rl}, & w_{si} > w_{rl} \end{cases}, \quad h_{di} = \begin{cases} h_{si}, & h_{si} \le h_{rl} \\ h_{rl}, & h_{si} > h_{rl} \end{cases},$$

wherein, $w_{di}$, $h_{di}$ represent the width and height of the pixel mixing region of the layer $L_i$, $w_{si}$, $h_{si}$ represent the width and height of the layer $L_i$, and $w_{rl}$, $h_{rl}$ represent the width and height of the layer with the identifier RL; and a second image generating unit, configured for generating the output image corresponding to the image generation instruction according to the image content displayed on the obtained pixel mixing regions.

In a specified implementation of the present application, the preset pixel mixing algorithm is a pixel mixing algorithm based on pixel transparency.

In a specified implementation of the present application, the layer generating module is specifically configured for generating one or more layers corresponding to the screenshot instruction, wherein the storage areas corresponding to the generated layers are independent with each other.

In a specified implementation of the present application, the layer currently in an unclosed state includes a layer currently in a foreground processing state and a layer currently in a background to-be-processed state;

the image generation device further comprises:

a switching instruction receiving module, configured for receiving a layer switching instruction, wherein, the layer switching instruction contains an identifier of a layer currently in a background to-be-processed state which is to be switched; and a state switching module, configured for switching the state of the layer currently in a foreground processing state into a background to-be-processed state, and switching the state of a layer corresponding to the identifier contained in the layer switching instruction into a foreground processing state.

To achieve the above objectives, embodiments of the present application disclose an electronic device, which comprises: a housing, a processor, a memory, a circuit board and a power supply circuit, wherein, the circuit board is arranged inside a space enclosed by the housing, the processor and the memory are arranged on the circuit board; the power supply circuit is configured to supply power for various circuits or elements of the electronic device; the memory is configured to store executable program codes, and the processor executes a program corresponding to the executable program codes by reading the executable program codes stored in the memory so as to perform the above image generation method.

To achieve the above objectives, embodiments of the present application disclose an application program, which is configured for performing the above image generation methods when being executed.

To achieve the above objectives, embodiments of the present application disclose a storage medium configured for storing an application program, the application program being configured for performing the above image generation methods when being executed.

As can be seen from above, in the solution provided by embodiments of the present application, after an image capturing instruction is received, firstly a layer corresponding to this image capturing instruction is generated, image content in a screen region selected by a user is stored into a storage area corresponding to the generated layer and the image content of the screen region selected by the user is displayed on the generated layer; in generating the image, after receiving an image generation instruction, an output image corresponding to the image generation instruction is generated according to one or more layers corresponding to one or more layer identifiers contained in the image generation instruction. The storage area corresponding to the generated layer is dependent of other storage areas corresponding to the layers in an unclosed state, as a result, when capturing images many times, the data coverage problem will not exist and thus capturing screenshots many times can be achieved without any need to quit the current image generation procedure. Therefore, the steps of capturing images many times can be simplified.

BRIEF DESCRIPTION OF THE DRAWINGS

In order to describe the embodiments of the present application and the technical solutions in the prior art more clearly, drawings required for embodiments of the present application and the prior art will be described briefly below. It is obvious that the drawings below are for only some embodiments of the present application, and those skilled in the art can also obtain further drawings based on these drawings without any creative efforts.

DETAILED DESCRIPTION OF THE INVENTION

In order to make the objections, technical solutions and advantages of the present application more apparent and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without doing creative works fall into the protection scope defined by the present application.

Figure 1:
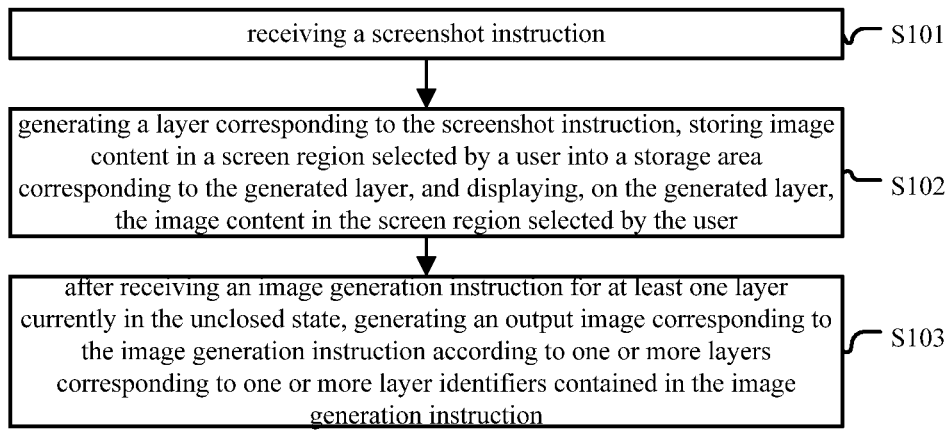
FIG. 1 is a first schematic flowchart of an image generation method provided by embodiments of the present application.

FIG. 1 is a first schematic flowchart of an image generation method provided by embodiments of the present application, which comprises:

S101: receiving a screenshot instruction.

The screenshot instruction received by a terminal device can be triggered by a user clicking on a user-preset screenshot button, and also can be triggered by a particular function involved during the operation of other applications by some terminal devices, and the like, for which the present application is not limited.

S102: generating a layer corresponding to the screenshot instruction, storing image content in a screen region selected by a user into a storage area corresponding to the generated layer, and displaying, on the generated layer, the image content in the screen region selected by the user.

It should be noted that the storage area corresponding to the generated layer is independent of the storage area corresponding to the layer, which is in an unclosed state, generated according to the previously received screenshot instruction.

In addition, the execution sequence between the above step of storing image content of a screen region selected by a user into a storage area corresponding to the generated layer and the above step of displaying, on the generated layer, the image content of the screen region selected by the user is not limited in the present application, the step of storing image content of a screen region selected by a user into a storage area corresponding to the generated layer can be performed before, after or simultaneously with the step of displaying, on the generated layer, the image content of the screen region selected by the user.

In an optional implementation of the present application, the layer in an unclosed state can be classified into two categories, i.e., a layer in a foreground processing state and a layer in a background to-be-processed state.

Specifically, for the windows operating system, the above-mentioned image content of a screen region selected by a user in a storage area can be understood as content of a region corresponding to the device context HDC.

Wherein, the device context HDC is a Windows data structure that contains information about the drawing attributes of a device (such as a display or a printer). All drawing calls are made through a device-context object, which encapsulates the Windows API for drawing lines, shapes, and texts. Device context allows for device-independent drawing in Windows. Device contexts can be used to draw to a screen, to a printer, or to a metafile.

Preferably, during the generation of a layer corresponding to a screenshot instruction, it is possible to generate one or more layers corresponding to this screenshot instruction according to specific application scenarios, the storage area corresponding to the generated layer and the storage area corresponding to the layer currently in an unclosed state are mutually independent.

In addition, in case that there are a plurality of layers generated, the storage areas corresponding to the various layers are independent with each other, the image content of a screen region selected by a user can be stored respectively into the screen regions corresponding to various generated layers. That is to say, at the initial stage of generating a plurality of layers corresponding to the screenshot instruction, the image content of a screen region selected by the user will be stored in different storage areas in multiple copies, it can be understood that the image content of a screen region selected by the user will be displayed in each of the generated layers. Further, the user also can edit image content displayed on each of the generated layers respectively, and the editing operations by the user on image content displayed on various layers are independent with each other.

S103: after receiving an image generation instruction for at least one layer currently in the unclosed state, generating an output image corresponding to the image generation instruction according to one or more layers corresponding to one or more layer identifiers contained in the image generation instruction.

Wherein, the image generation instruction at least contains one or more layer identifiers of one or more layers selected by the user.

The layers currently in an unclosed state can be one or more layers, as a result, it can be understood that the image generation instruction can be an image generation instruction for one layer, or an image generation instruction for a plurality of layers. Description will be made for the following different cases:

In case that the image generation instruction is an image generation instruction for one layer, the image generation instruction comprises the identifier of one layer selected by the user; in this case, generating an output image corresponding to the image generation instruction according to one or more layers corresponding to one or more layer identifiers contained in the image generation instruction may comprise firstly creating an operating system image object, then generating an output image corresponding to the image generation instruction by copying the image content displayed on the layer selected by the user to the created operating system image object according to the layer identifier contained in the image generation instruction.

For example, in the windows operating system, it is possible to firstly create a windows graphics object Bitmap, then to copy the content of the corresponding region of the device context HDC corresponding to the layer into the created Bitmap graphics object according to the identifier of the layer comprised in the image generation instruction.

Figure 2:
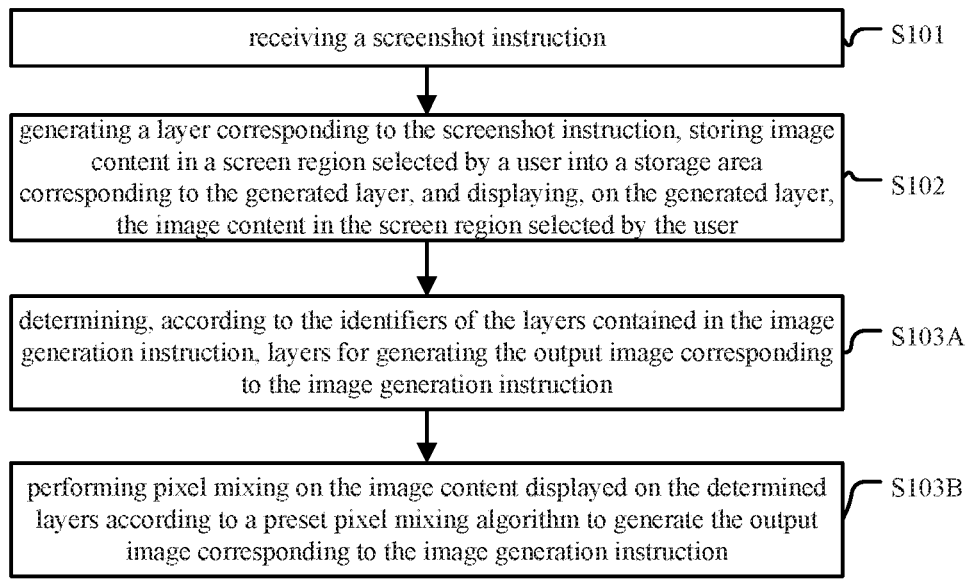
FIG. 2 is a second schematic flowchart of an image generation method provided by embodiments of the present application.

In case that the image generation instruction is an image generation instruction for a plurality of layers, the image generation instruction comprises the identifiers of a plurality of layers selected by the user, in this case, when generating an output image corresponding to the image generation instruction according to one or more layers corresponding to one or more layer identifiers contained in the image generation instruction, content of a plurality of layers should be considered. Specifically, reference to FIG. 2, which provides a second schematic flowchart of an image generation method, compared to the aforementioned embodiments, in the present embodiment, in case that the image generation instruction contains identifiers of a plurality of layers selected by the user, generating (S103) an output image corresponding to the image generation instruction according to one or more layers corresponding to one or more layer identifiers contained in the image generation instruction comprises:

S103A: determining, according to the identifiers of the layers contained in the image generation instruction, layers for generating the output image corresponding to the image generation instruction.

S103B: performing pixel mixing on the image content displayed on the determined layers according to a preset pixel mixing algorithm to generate the output image corresponding to the image generation instruction.

Storage areas corresponding to various layers are independent with each other, image content displayed on various layers cannot be mixed together and the phenomenon that image content displayed on one layer is covered by image content displayed on other layers will not happen, as a result, when performing a pixel mixing operation on the image content displayed on various determined layers, it is necessary to obtain pixel information of the image content displayed on various layers from different storage areas.

It can be understood that the sizes of various layers selected by a user may be identical or different, in view of above, during the generation of an output image corresponding to an image generation instruction, it is possible to specify a reference layer, and when generating the above-mentioned output image, to perform a scaling process or cut process and the like on the image content displayed on the layers selected by a user with a reference to the specified reference layer, and then generate the output image according to the processed image content. In this case, the image generation instruction further contains an identifier RL of a reference layer.

The reference layer can be one layer among a plurality of layers selected by a user, or one layer not belonging to the layers selected by a user and among layers in an unclosed state.

In a specific implementation of the present application, when performing pixel mixing on the image content displayed on the determined respective layers according to a preset pixel mixing algorithm to generate the output image corresponding to the image generation instruction, it is possible to firstly search, in the determined layers, for a layer whose size is inconsistent with that of the layer with the identifier RL, then to determine corresponding scaling ratios for the searched layers respectively according to the size of the layer with the identifier RL and the sizes of the searched layers, and to the image content displayed on the searched layers according to the corresponding scaling ratios for the searched layers respectively; and finally to pixel mixing on the scaled image content and the image content displayed on a layer whose size is consistent with the layer with the identifier RL among the determined layers to generate the output image corresponding to the image generation instruction.

Wherein, the sizes of the searched layers that are scaled according to the determined corresponding scaling ratios are consistent with the size of the layer with the identifier RL.

As can be seen from the above description, image content are displayed on a layer, thus the size of the image content displayed on a layer is normally smaller than that of the layer.

With reference to the idea provided by the above specific embodiments, in order to facilitate the accurate determination of relative location relationship between image content after a scaling process and image content displayed on a layer whose size is consistent with that of the layer with the identifier of RL, it is possible to perform a scaling process on the image content displayed on the found various layers according to the corresponding scaling ratios of the found various layers respectively, in this way, the sizes of layers corresponding to the image content involved during the generation of an output image are all consistent with that of the reference layer, and it is possible to determine the relative relationship between image content involved during the generation of the output image with the aid of layers after a scaling process and the layer, among the determined layers, with a consistent size with the layer with the identifier of RL.

In another specific implementation of the present application, when performing pixel mixing on the image content displayed on the determined layers according to a preset pixel mixing algorithm to generate the output image corresponding to the image generation instruction, it is possible to obtain a pixel mixing region of any layer Li in the determined layers according to the following expressions, $$w_{di} = \begin{cases} w_{si}, & w_{si} \leq w_{rl} \\ w_{rl}, & w_{si} > w_{rl} \end{cases}, \quad h_{di} = \begin{cases} h_{si}, & h_{si} \leq h_{rl} \\ h_{rl}, & h_{si} > h_{rl} \end{cases},$$

wherein, $w_{di}$, $h_{di}$ represent the width and height of the pixel mixing region of the layer $L_i$, $w_{si}$, $h_{si}$ represent the width and height of the layer $L_i$, and $w_{rl}$, $h_{rl}$ represent the width and height of the layer with the identifier RL;

then, it is possible to generate the output image corresponding to the image generation instruction according to the image content displayed on the obtained pixel mixing regions.

In practical applications, images exist in many formats, such as RGB format, YUV format, and so on. For different image formats, different pixel mixing algorithms can be used during the pixel mixing operation.

The pixel information of each pixel in certain image formats comprises transparency information, preferably, a pixel mixing algorithm based on pixel transparency can be used to perform a pixel mixing operation. i.e., the preset pixel mixing algorithm is a pixel mixing algorithm based on pixel transparency.

Simply, the pixel mixing operation can be understood as an output process in which a target pixel and a source pixel are mixed with a certain mixing method.

A brief description of a pixel mixing process will be made taking images in RGBA format for example as follows.

In case that the image format is RGBA, pixel information of a pixel comprises four components, i.e., R color component, G color component, B color component and A transparency component, and the pixel mixing process based on transparency can be described as follows:

Assume that Src, Dest, Tmp are a source pixel, a target pixel, a temporary pixel respectively, MixAlpha is mixed transparency ranged from 0 to 255, Red, Blue, Green, Alhpa are four components of a pixel, and Round () is a Round function. The process of calculating four components of Dest according to four components of Src is:

Tmp.Red=Src.Red*MixAlpha/255;

Tmp.Green=Src.Green*MixAlpha/255;

Tmp.Blue=Src.Blue*MixAlpha/255;

Tmp.Alpha=Src.Alpha*MixAlpha/255;

Value=255−Tmp.Alpha;

Dest.Red=Tmp.Red+Round((Dest.Red*Value)/255);

Dest.Green=Tmp.Green+Round((Dest.Green*Value)/255);

Dest.Blue=Tmp.Blue+Round((Dest.Blue*Value)/255);

Dest.Alpha=Tmp.Alpha+Round((Dest.Alphg*Value)/255).

It should be noted that the above description is illustrative only in the present application, and the pixel mixing process is not limited to that in practical applications.

As can be seen from the previous description, in the solution provided by embodiments of the present application, a plurality of layers can exist at the same time, which can be referred to as layers in an unclosed state. Although a plurality of layers can exist at the same time, normally only one layer is in a foreground state at the current moment, while other layers are temporarily in a background to-be-processed state.

In a preferable implementation of the present application, in case that the layer currently in an unclosed state includes a layer currently in a foreground processing state and a layer currently in a background to-be-processed state, the image generation method can further comprise:

receiving a layer switching instruction, wherein, the layer switching instruction contains an identifier of a layer currently in a background to-be-processed state which is to be switched; and switching the state of the layer currently in a foreground processing state into a background to-be-processed state, and switching the state of a layer corresponding to the identifier contained in the layer switching instruction into a foreground processing state. In this way, it is possible to easily switch between various layers currently in an unclosed state.

As can be seen from above, in the solution provided by various embodiments described above, after an image capturing instruction is received, firstly a layer corresponding to this image capturing instruction is generated, image content in a screen region selected by a user is stored into a storage area corresponding to the generated layer and the image content of the screen region selected by the user is displayed on the generated layer; in generating the image, after receiving an image generation instruction, an output image corresponding to the image generation instruction is generated according to one or more layers corresponding to one or more layer identifiers contained in the image generation instruction. The storage area corresponding to the generated layer is dependent of other storage areas corresponding to the layers in an unclosed state, as a result, when capturing images many times, the data coverage problem will not exist and thus capturing screenshots many times can be achieved without any need to quit the current image generation procedure. Therefore, the steps of capturing images many times can be simplified.

Figure 3:
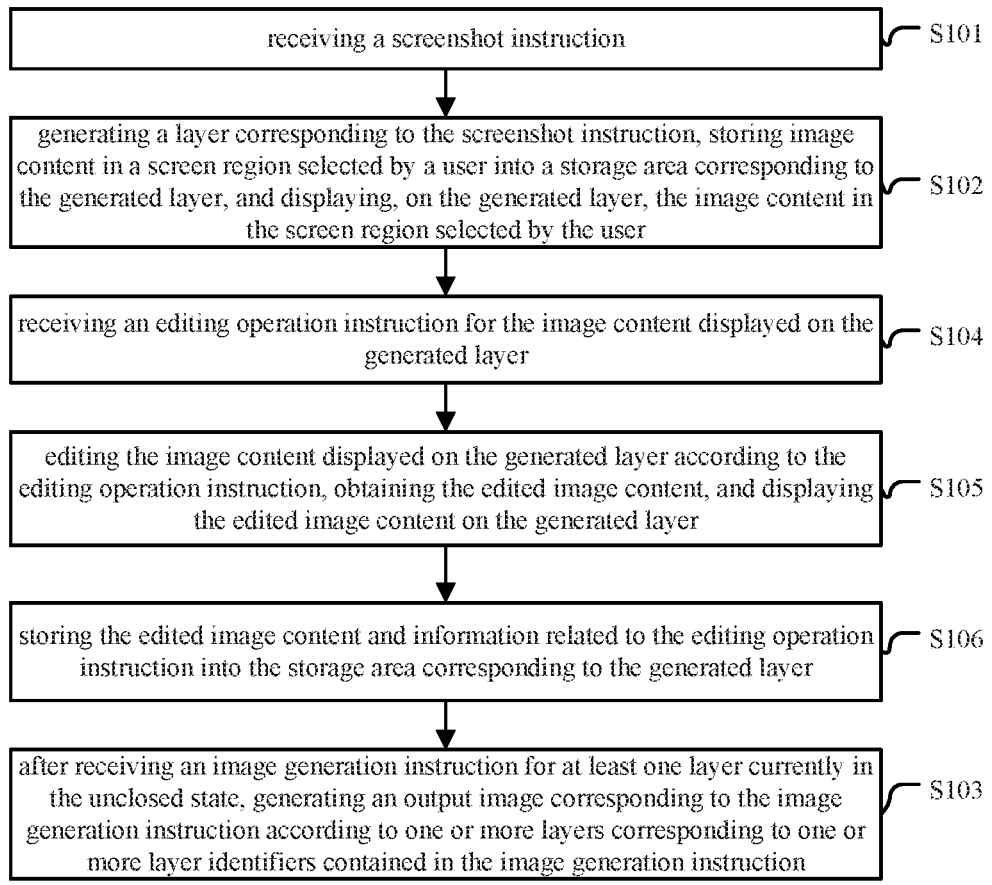
FIG. 3 is a third schematic flowchart of an image generation method provided by embodiments of the present application.

In a specific implementation of the present application, refer to FIG. 3, which provides a third schematic flowchart of an image generation method, compared to the aforementioned embodiments, in the present embodiment, after displaying (S102), on the generated layer, the image content in the screen region selected by the user, the method further comprises:

S104: receiving an editing operation instruction for the image content displayed on the generated layer.

The editing operation instruction can be an operation instruction for adding text information on the image content displayed on the generated layer, an operation instruction for drawing geometric figures, an operation instruction for changing the color of an image, and so on.

Wherein, the editing operation instruction can comprise the identifier of a layer, the coordinate of a fixed point in the upper left corner of the operation area, or the coordinate of a fixed point in the lower right corner and the operation identifier and so on.

S105: editing the image content displayed on the generated layer according to the editing operation instruction, obtaining the edited image content, and displaying the edited image content on the generated layer.

S106: storing the edited image content and information related to the editing operation instruction into the storage area corresponding to the generated layer.

Information related to the editing operation instruction can comprise the generation sequence of various editing operation instructions, content of various editing operation instructions etc. when editing the image content displayed on the generated layer.

The specific content of information related to the editing operation instruction is not limited in the present application.

As can be seen from above, in the solution provided by the present embodiment, the image content displayed on the generated layers are allowed to be edited by users and the edited image content and information related to an editing operation instruction can be stored into a storage area corresponding to the generated layer, which helps users to recover the edited image content through the revocation operation or other operations, providing convenience for users to generate images.

Corresponding to the above image generation device, embodiments of the present application further provide an image generation device.

Figure 4:
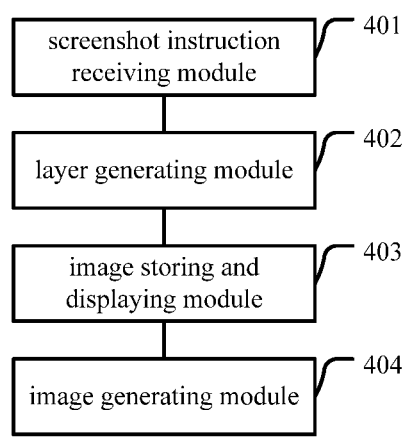
FIG. 4 is a schematic structural diagram of an image generation device provided by embodiments of the present application.

FIG. 4 is a schematic structural diagram of an image generation device provided by the embodiments of the present application, which comprises:

a screenshot instruction receiving module 401, configured for receiving a screenshot instruction;

a layer generating module 402, configured for generating a layer corresponding to the screenshot instruction, wherein, the storage area corresponding to the generated layer is independent of the storage area corresponding to the layer, which is in an unclosed state, generated according to the previously received screenshot instruction;

an image storing and displaying module 403, configured for storing image content in a screen region selected by a user into a storage area corresponding to the generated layer, and displaying, on the generated layer, the image content in the screen region selected by the user; and an image generating module 404, configured for generating, after receiving an image generation instruction for at least one layer currently in the unclosed state, an output image corresponding to the image generation instruction according to one or more layers corresponding to one or more layer identifiers contained in the image generation instruction, wherein the image generation instruction contains one or more layer identifiers of one or more layers selected by the user.

Specifically, the image generation device can further comprise:

an editing operation instruction receiving module, configured for receiving an editing operation instruction for the image content displayed on the generated layer after the image storing and displaying module 403 displaying, on the generated layer, the image content in the screen region selected by the user;

an image displaying module, configured for editing the image content displayed on the generated layer according to the editing operation instruction, obtaining the edited image content, and displaying the edited image content on the generated layer; and an information storing module, configured for storing the edited image content and information related to the editing operation instruction into the storage area corresponding to the generated layer.

In an optional implementation of the present application, in case that the image generation instruction contains an identifier of one layer selected by the user, the image generating module 404 comprises:

an object creating submodule, configured for creating an operating system image object; and a first image generating submodule, configured for generating an output image corresponding to the image generation instruction by copying the image content displayed on the layer selected by the user to the created operating system image object according to the layer identifier contained in the image generation instruction.

In another optional implementation of the present application, in case that the image generation instruction contains identifiers of a plurality of layers selected by the user, the image generating module 404 comprises:

a layer determining submodule, configured for determining, according to the identifiers of the layers contained in the image generation instruction, layers for generating the output image corresponding to the image generation instruction; and a second layer determining submodule, configured for performing pixel mixing on the image content displayed on the determined layers according to a preset pixel mixing algorithm to generate the output image corresponding to the image generation instruction.

Optionally, the image generation instruction can further contains an identifier RL of a reference layer;

the second layer determining submodule comprises:

a layer searching unit, configured for searching, in the determined layers, for a layer whose size is inconsistent with that of the layer with the identifier RL;

a scaling ratio determining unit, configured for determining corresponding scaling ratios for the searched layers respectively according to the size of the layer with the identifier RL and the sizes of the searched respective layers, wherein, the sizes of the searched layers that are scaled according to the determined corresponding scaling ratios are consistent with the size of the layer with the identifier RL;

a scaling processing unit, configured for scaling the image content displayed on the searched layers according to the corresponding scaling ratios for the searched layers respectively; and a first image generating unit, configured for performing pixel mixing on the scaled image content and the image content displayed on a layer whose size is consistent with the layer with the identifier RL among the determined layers to generate the output image corresponding to the image generation instruction.

Optionally, the image generation instruction can further contains identifier RL of a reference layer;

the second layer determining submodule comprises:

a region determining unit, configured for obtaining a pixel mixing region of any layer Li in the determined layers according to the following expressions, $$w_{di} = \begin{cases} w_{si}, & w_{si} \leq w_{rl} \\ w_{rl}, & w_{si} > w_{rl} \end{cases}, \quad h_{di} = \begin{cases} h_{si}, & h_{si} \leq h_{rl} \\ h_{rl}, & h_{si} > h_{rl} \end{cases},$$

wherein, $w_{di}$, $h_{di}$ represent the width and height of the pixel mixing region of the layer $L_i$, $w_{si}$, $h_{si}$ represent the width and height of the layer $L_i$, and $w_{rl}$, $h_{rl}$ represent the width and height of the layer with the identifier RL; and a second image generating unit, configured for generating the output image corresponding to the image generation instruction according to the image content displayed on the obtained pixel mixing regions.

Specifically, the preset pixel mixing algorithm can be a pixel mixing algorithm based on pixel transparency.

Specifically, the layer generating module 402 can specifically be configured for generating one or more layers corresponding to the screenshot instruction, wherein the storage areas corresponding to the generated layers are independent with each other.

Specifically, the layer currently in an unclosed state includes a layer currently in a foreground processing state and a layer currently in a background to-be-processed state;

the image generation device can further comprise:

a switching instruction receiving module, configured for receiving a layer switching instruction, wherein, the layer switching instruction contains an identifier of a layer currently in a background to-be-processed state which is to be switched; and a state switching module, configured for switching the state of the layer currently in a foreground processing state into a background to-be-processed state, and switching the state of a layer corresponding to the identifier contained in the layer switching instruction into a foreground processing state.

As can be seen from above, in the solution provided by various embodiments described above, after an image capturing instruction is received, firstly a layer corresponding to this image capturing instruction is generated, image content in a screen region selected by a user is stored into a storage area corresponding to the generated layer and the image content of the screen region selected by the user is displayed on the generated layer; in generating the image, after receiving an image generation instruction, an output image corresponding to the image generation instruction is generated according to one or more layers corresponding to one or more layer identifiers contained in the image generation instruction. The storage area corresponding to the generated layer is dependent of other storage areas corresponding to the layers in an unclosed state, as a result, when capturing images many times, the data coverage problem will not exist and thus capturing screenshots many times can be achieved without any need to quit the current image generation procedure. Therefore, the steps of capturing images many times can be simplified.

The embodiments of an device are briefly described and reference can be made to the description of the embodiments of a method for its related contents since the embodiments of the device are substantially similar to those of the method.

Figure 5:
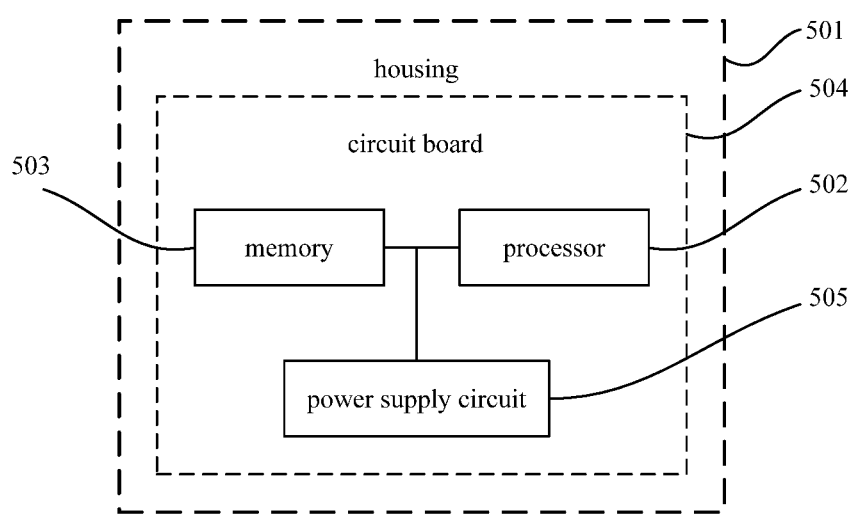
FIG. 5 is a schematic structural diagram of an electronic device provided by embodiments of the present application.

Embodiments of the present application further provide an electronic device, as shown in FIG. 5, which comprises: a housing 501, a processor 502, a memory 503, a circuit board 504 and a power supply circuit 505, wherein, the circuit board 504 is arranged inside a space enclosed by the housing 501, the processor 502 and the memory 503 are arranged on the circuit board 504; the power supply circuit 505 is configured to supply power for various circuits or elements of the electronic device; the memory 503 is configured to store executable program codes, and the processor 502 executes a program corresponding to the executable program codes by reading the executable program codes stored in the memory 503 so as to perform the image generation method, the method comprises:

receiving a screenshot instruction;

generating a layer corresponding to the screenshot instruction, storing image content in a screen region selected by a user into a storage area corresponding to the generated layer, and displaying, on the generated layer, the image content in the screen region selected by the user, wherein, the storage area corresponding to the generated layer is independent of the storage area corresponding to the layer, which is in an unclosed state, generated according to the previously received screenshot instruction; and after receiving an image generation instruction for at least one layer currently in the unclosed state, generating an output image corresponding to the image generation instruction according to one or more layers corresponding to one or more layer identifiers contained in the image generation instruction, wherein the image generation instruction contains one or more layer identifiers of one or more layers selected by the user.

By applying the embodiment as shown in FIG. 5 of the present application, after an image capturing instruction is received, firstly a layer corresponding to this image capturing instruction is generated, image content in a screen region selected by a user is stored into a storage area corresponding to the generated layer and the image content of the screen region selected by the user is displayed on the generated layer; in generating the image, after receiving an image generation instruction, an output image corresponding to the image generation instruction is generated according to one or more layers corresponding to one or more layer identifiers contained in the image generation instruction. The storage area corresponding to the generated layer is dependent of other storage areas corresponding to the layers in an unclosed state, as a result, when capturing images many times, the data coverage problem will not exist and thus capturing screenshots many times can be achieved without any need to quit the current image generation procedure. Therefore, the steps of capturing images many times can be simplified.

Embodiments of the present application further provide an application program, which is for performing the image generation method when being executed, the method comprises:

receiving a screenshot instruction;

generating a layer corresponding to the screenshot instruction, storing image content in a screen region selected by a user into a storage area corresponding to the generated layer, and displaying, on the generated layer, the image content in the screen region selected by the user, wherein, the storage area corresponding to the generated layer is independent of the storage area corresponding to the layer, which is in an unclosed state, generated according to the previously received screenshot instruction; and after receiving an image generation instruction for at least one layer currently in the unclosed state, generating an output image corresponding to the image generation instruction according to one or more layers corresponding to one or more layer identifiers contained in the image generation instruction, wherein the image generation instruction contains one or more layer identifiers of one or more layers selected by the user.

By applying the embodiment as shown in the present application, after an image capturing instruction is received, firstly a layer corresponding to this image capturing instruction is generated, image content in a screen region selected by a user is stored into a storage area corresponding to the generated layer and the image content of the screen region selected by the user is displayed on the generated layer; in generating the image, after receiving an image generation instruction, an output image corresponding to the image generation instruction is generated according to one or more layers corresponding to one or more layer identifiers contained in the image generation instruction. The storage area corresponding to the generated layer is dependent of other storage areas corresponding to the layers in an unclosed state, as a result, when capturing images many times, the data coverage problem will not exist and thus capturing screenshots many times can be achieved without any need to quit the current image generation procedure. Therefore, the steps of capturing images many times can be simplified.

Embodiments of the present application further provide a storage medium which is configured for storing an application program, the application program is configured for storing performing the image generation method when being executed, the method comprises:

receiving a screenshot instruction;

generating a layer corresponding to the screenshot instruction, storing image content in a screen region selected by a user into a storage area corresponding to the generated layer, and displaying, on the generated layer, the image content in the screen region selected by the user, wherein, the storage area corresponding to the generated layer is independent of the storage area corresponding to the layer, which is in an unclosed state, generated according to the previously received screenshot instruction; and after receiving an image generation instruction for at least one layer currently in the unclosed state, generating an output image corresponding to the image generation instruction according to one or more layers corresponding to one or more layer identifiers contained in the image generation instruction, wherein the image generation instruction contains one or more layer identifiers of one or more layers selected by the user.

By applying the embodiment as shown in the present application, after an image capturing instruction is received, firstly a layer corresponding to this image capturing instruction is generated, image content in a screen region selected by a user is stored into a storage area corresponding to the generated layer and the image content of the screen region selected by the user is displayed on the generated layer; in generating the image, after receiving an image generation instruction, an output image corresponding to the image generation instruction is generated according to one or more layers corresponding to one or more layer identifiers contained in the image generation instruction. The storage area corresponding to the generated layer is dependent of other storage areas corresponding to the layers in an unclosed state, as a result, when capturing images many times, the data coverage problem will not exist and thus capturing screenshots many times can be achieved without any need to quit the current image generation procedure. Therefore, the steps of capturing images many times can be simplified.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

It can be understood by a person skilled in the art that all or a part of steps in the implementations of the above method can be carried out by related hardware being instructed by programs, which can be stored in a computer readable storage medium, such as ROM/RAM, disk and optical disk etc.

The embodiments described above are just preferable embodiments of the present application, and not indented to limit the present application. Any modifications, alternatives, improvements or the like within the spirit and principle of the present application shall be comprised in the protection scope of the present application.

The invention claimed is:

1. An image generation method, comprising:
receiving a screenshot instruction;
generating a plurality of layers corresponding to the screenshot instruction, storing image content in a screen region selected by a user into a plurality of storage areas corresponding to the generated layers, and displaying, on the generated layers, the image content in the screen region selected by the user, wherein, the plurality of storage areas corresponding to the generated layers are independent of a storage area corresponding to a layer, which is in an unclosed state, generated according to a previously received screenshot instruction; and
after receiving an image generation instruction for at least one layer currently in the unclosed state, generating an output image corresponding to the image generation instruction according to one or more layers corresponding to one or more layer identifiers contained in the image generation instruction, wherein the image generation instruction contains one or more layer identifiers of one or more layers selected by the user.

2. The method according to claim 1, wherein, after displaying, on the generated layer, the image content in the screen region selected by the user, the method further comprises:
receiving an editing operation instruction for the image content displayed on the generated layer;
editing the image content displayed on the generated layer according to the editing operation instruction, obtaining the edited image content, and displaying the edited image content on the generated layer; and
storing the edited image content and information related to the editing operation instruction into the storage area corresponding to the generated layer.

3. The method according to claim 1, wherein, in case that the image generation instruction contains an identifier of one layer selected by the user, generating an output image corresponding to the image generation instruction according to one or more layers corresponding to one or more layer identifiers contained in the image generation instruction comprises:
creating an operating system image object; and
generating an output image corresponding to the image generation instruction by copying the image content displayed on the layer selected by the user to the created operating system image object according to the layer identifier contained in the image generation instruction.

4. The method according to claim 1, wherein, in case that the image generation instruction contains identifiers of a plurality of layers selected by the user, generating an output image corresponding to the image generation instruction according to one or more layers corresponding to one or more layer identifiers contained in the image generation instruction comprises:
determining, according to the identifiers of the layers contained in the image generation instruction, layers for generating the output image corresponding to the image generation instruction; and
performing pixel mixing on the image content displayed on the determined layers according to a preset pixel mixing algorithm to generate the output image corresponding to the image generation instruction.

5. The method according to claim 4, wherein,
the image generation instruction further contains an identifier RL of a reference layer; and
wherein, performing pixel mixing on the image content displayed on the determined respective layers according to a preset pixel mixing algorithm to generate the output image corresponding to the image generation instruction comprises:
searching, in the determined layers, for a layer whose size is inconsistent with that of the layer with the identifier RL;
determining corresponding scaling ratios for the searched layers respectively according to the size of the layer with the identifier RL and the sizes of the searched layers, wherein, the sizes of the searched layers that are scaled according to the determined corresponding scaling ratios are consistent with the size of the layer with the identifier RL;
scaling the image content displayed on the searched layers according to the corresponding scaling ratios for the searched layers respectively; and
performing pixel mixing on the scaled image content and the image content displayed on a layer whose size is consistent with the layer with the identifier RL among the determined layers to generate the output image corresponding to the image generation instruction.

6. The method according to claim 4, wherein,
the image generation instruction further comprises identifier RL of a reference layer; and
wherein, performing pixel mixing on the image content displayed on the determined layers according to a preset pixel mixing algorithm to generate the output image corresponding to the image generation instruction comprises:
obtaining a pixel mixing region of any layer Li in the determined layers according to the following expressions, $$w_{di} = \begin{cases} w_{si}, & w_{si} \leq w_{rl} \\ w_{rl}, & w_{si} > w_{rl} \end{cases}, \quad h_{di} = \begin{cases} h_{si}, & h_{si} \leq h_{rl} \\ h_{rl}, & h_{si} > h_{rl} \end{cases},$$

wherein, $w_{di}$, $h_{di}$ represent the width and height of the pixel mixing region of the layer $L_i$, $w_{si}$, $h_{si}$ represent the width and height of the layer $L_i$, and $w_{rl}$, $h_{rl}$ represent the width and height of the layer with the identifier RL; and
generating the output image corresponding to the image generation instruction according to the image content displayed on the obtained pixel mixing regions.

7. The method according to claim 4, wherein, the preset pixel mixing algorithm is a pixel mixing algorithm based on pixel transparency.

8. The method according to claim 1, wherein,
the storage areas corresponding to the generated layers are independent with each other.

9. The method according to claim 1, wherein,
the layer currently in an unclosed state includes a layer currently in a foreground processing state and a layer currently in a background to-be-processed state; and
wherein, the method further comprises:

receiving a layer switching instruction, wherein, the layer switching instruction contains an identifier of a layer currently in a background to-be-processed state which is to be switched; and switching the state of the layer currently in a foreground processing state into a background to-be-processed state, and switching the state of a layer corresponding to the identifier contained in the layer switching instruction into a foreground processing state.

10. An electronic device, comprises: a housing, a processor, a memory, a circuit board and a power supply circuit, wherein, the circuit board is arranged inside a space enclosed by the housing, the processor and the memory are arranged on the circuit board; the power supply circuit is configured to supply power for various circuits or elements of the electronic device; the memory is configured to store executable program codes, and the processor executes a program corresponding to the executable program codes by reading the executable program codes stored in the memory so as to perform:

receiving a screenshot instruction;

generating a plurality of layers corresponding to the screenshot instruction, storing image content in a screen region selected by a user into a plurality of storage areas corresponding to the generated layers, and displaying, on the generated layers, the image content in the screen region selected by the user, wherein, the plurality of storage areas corresponding to the generated layers are independent of a storage area corresponding to a layer, which is in an unclosed state, generated according to a previously received screenshot instruction; and after receiving an image generation instruction for at least one layer currently in the unclosed state, generating an output image corresponding to the image generation instruction according to one or more layers corresponding to one or more layer identifiers contained in the image generation instruction, wherein the image generation instruction contains one or more layer identifiers of one or more layers selected by the user.

11. The electronic device according to claim 10, wherein, after displaying, on the generated layer, the image content in the screen region selected by the user, the processor executes a program corresponding to the executable program codes by reading the executable program codes stored in the memory so as to perform:

receiving an editing operation instruction for the image content displayed on the generated layer after the image storing and displaying module displaying, on the generated layer, the image content in the screen region selected by the user;

editing the image content displayed on the generated layer according to the editing operation instruction, obtaining the edited image content, and displaying the edited image content on the generated layer; and storing the edited image content and information related to the editing operation instruction into the storage area corresponding to the generated layer.

12. The electronic device according to claim 10, wherein, in case that the image generation instruction contains an identifier of one layer selected by the user, the processor executes a program corresponding to the executable program codes by reading the executable program codes stored in the memory so as to perform:

creating an operating system image object; and generating an output image corresponding to the image generation instruction by copying the image content displayed on the layer selected by the user to the created operating system image object according to the layer identifier contained in the image generation instruction.

13. The electronic device according to claim 10, wherein, in case that the image generation instruction contains identifiers of a plurality of layers selected by the user, the processor executes a program corresponding to the executable program codes by reading the executable program codes stored in the memory so as to perform:

determining, according to the identifiers of the layers contained in the image generation instruction, layers for generating the output image corresponding to the image generation instruction; and performing pixel mixing on the image content displayed on the determined layers according to a preset pixel mixing algorithm to generate the output image corresponding to the image generation instruction.

14. The electronic device according to claim 13, wherein, the image generation instruction further contains an identifier RL of a reference layer; and the processor executes a program corresponding to the executable program codes by reading the executable program codes stored in the memory so as to perform:

searching, in the determined layers, for a layer whose size is inconsistent with that of the layer with the identifier RL;

determining corresponding scaling ratios for the searched layers respectively according to the size of the layer with the identifier RL and the sizes of the searched respective layers, wherein, the sizes of the searched layers that are scaled according to the determined corresponding scaling ratios are consistent with the size of the layer with the identifier RL;

scaling the image content displayed on the searched layers according to the corresponding scaling ratios for the searched layers respectively; and performing pixel mixing on the scaled image content and the image content displayed on a layer whose size is consistent with the layer with the identifier RL among the determined layers to generate the output image corresponding to the image generation instruction.

15. The electronic device according to claim 13, wherein, the image generation instruction further contains identifier RL of a reference layer; and the processor executes a program corresponding to the executable program codes by reading the executable program codes stored in the memory so as to perform:

obtaining a pixel mixing region of any layer Li in the determined layers according to the following expressions, $$w_{di} = \begin{cases} w_{si}, & w_{si} \le w_{rl} \\ w_{rl}, & w_{si} > w_{rl} \end{cases}, \quad h_{di} = \begin{cases} h_{si}, & h_{si} \le h_{rl} \\ h_{rl}, & h_{si} > h_{rl} \end{cases},$$

wherein, $w_{di}$, $h_{di}$ represent the width and height of the pixel mixing region of the layer $L_i$, $w_{si}$, $h_{si}$ represent the width and height of the layer $L_i$, and $w_{rl}$, $h_{rl}$ represent the width and height of the layer with the identifier RL; and generating the output image corresponding to the image generation instruction according to the image content displayed on the obtained pixel mixing regions.

16. The electronic device according to claim 13, wherein, the preset pixel mixing algorithm is a pixel mixing algorithm based on pixel transparency.

17. The electronic device according to claim 10, wherein, the storage areas corresponding to the generated layers are independent with each other.

18. The electronic device according to claim 10, wherein,
the layer currently in an unclosed state includes a layer currently in a foreground processing state and a layer currently in a background to-be-processed state; and
wherein, the processor executes a program corresponding to the executable program codes by reading the executable program codes stored in the memory so as to perform:
receiving a layer switching instruction, wherein, the layer switching instruction contains an identifier of a layer currently in a background to-be-processed state which is to be switched; and
switching the state of the layer currently in a foreground processing state into a background to-be-processed state, and switching the state of a layer corresponding to the identifier contained in the layer switching instruction into a foreground processing state.

19. A non-transitory storage medium, wherein the storage medium is configured for storing an application program, the application program being configured for performing the image generation method according to claim 1 when being executed.

* * * * *